United States Patent
Hong

(10) Patent No.: US 11,148,800 B2
(45) Date of Patent: Oct. 19, 2021

(54) VERTICAL TAKEOFF AND LANDING AIRCRAFT

(71) Applicant: Seung il Hong, Gangneung-si (KR)

(72) Inventor: Seung il Hong, Gangneung-si (KR)

(*) Notice: Subject to any disclaimer, the term of this patent is extended or adjusted under 35 U.S.C. 154(b) by 21 days.

(21) Appl. No.: 16/651,852

(22) PCT Filed: Sep. 27, 2018

(86) PCT No.: PCT/KR2018/011414
§ 371 (c)(1),
(2) Date: Mar. 27, 2020

(87) PCT Pub. No.: WO2019/066484
PCT Pub. Date: Apr. 4, 2019

(65) Prior Publication Data
US 2020/0255135 A1 Aug. 13, 2020

(30) Foreign Application Priority Data
Sep. 28, 2017 (KR) .................. 10-2017-0126332

(51) Int. Cl.
*B64C 29/00* (2006.01)
*B64C 39/04* (2006.01)
*B64C 39/08* (2006.01)

(52) U.S. Cl.
CPC ...... *B64C 29/0033* (2013.01); *B64C 29/0091* (2013.01); *B64C 39/08* (2013.01)

(58) Field of Classification Search
CPC .. B64C 29/0033; B64C 29/0091; B64C 39/04
See application file for complete search history.

(56) References Cited

U.S. PATENT DOCUMENTS

| 2,825,514 A * | 3/1958 | Focke ................. B64C 29/0033 244/7 R |
| 8,453,962 B2 * | 6/2013 | Shaw ..................... B64C 27/28 244/17.23 |

(Continued)

FOREIGN PATENT DOCUMENTS

| JP | 2016-172557 | 9/2016 |
| KR | 20-0286578 | 8/2002 |

(Continued)

OTHER PUBLICATIONS

International Search Report, with English translation, corresponding to International Application No. PCT/KR2018/011414, dated Jan. 10, 2019.

*Primary Examiner* — Brian M O'Hara
(74) *Attorney, Agent, or Firm* — Kile Park Reed & Houtteman PLLC

(57) ABSTRACT

A vertical takeoff and landing aircraft includes a flight fuselage on which a main wing and auxiliary wings are mounted; a pair of front propellers respectively mounted at both sides of the flight fuselage so as to be variable in the horizontal and vertical directions; a rear propeller mounted on the auxiliary wings provided at the rear of the flight fuselage so as to be variable in the horizontal and vertical directions; front and rear variable parts mounted on the flight fuselage and the auxiliary wings so as to vary the front propellers and the rear propeller in the horizontal or vertical direction; and a control unit for controlling the front and rear variable parts.

7 Claims, 12 Drawing Sheets

(56) References Cited

U.S. PATENT DOCUMENTS

| | | | |
|---|---|---|---|
| 8,646,720 B2* | 2/2014 | Shaw | B64C 29/0025 |
| | | | 244/17.23 |
| 10,287,011 B2* | 5/2019 | Wolff | B64C 39/024 |
| 10,543,905 B1* | 1/2020 | Kwon | B64D 27/24 |
| 10,562,623 B1* | 2/2020 | Sloan | B64C 25/10 |
| 2012/0091257 A1 | 4/2012 | Wolff et al. | |
| 2013/0264429 A1* | 10/2013 | Miodushevsky | B64C 29/0033 |
| | | | 244/7 A |
| 2017/0240274 A1* | 8/2017 | Regev | B64D 35/08 |
| 2018/0208305 A1* | 7/2018 | Lloyd | B60L 50/61 |

FOREIGN PATENT DOCUMENTS

| | | |
|---|---|---|
| KR | 10-2003-0049796 | 6/2003 |
| KR | 10-2009-0101413 | 9/2009 |
| KR | 10-2015-7006351 | 5/2015 |
| KR | 10-2016-0116748 | 10/2016 |

* cited by examiner

VERTICAL TAKEOFF AND LANDING AIRCRAFT

TECHNICAL FIELD

The present invention relates to a vertical takeoff and landing aircraft, more specifically, which can concentrate simultaneously thrust of front and rear propellers rearward during takeoff and landing such that the rear propeller can also vary a thrust direction as well as a front propeller, and can appropriately control propulsion force of the front and rear propellers by detecting the imbalance of the propulsion force that occurs between the front and rear propellers where the propulsion force of the front propeller is increased more than that of the rear propeller at the time of takeoff because the front propellers are two and the rear propeller is one.

BACKGROUND ART

Due to the rapid development into industrial society, the proportion of using airplane as a means of transportation is gradually increasing.

However, other aircrafts, except for helicopters capable of vertical takeoff and landing, are not popularized because a runway of a certain length is provided, the cost of securing the land is increased, and a long travel time to the airfield is required.

In addition, there are many difficulties in constructing an airfield in areas with many mountainous areas, and civil complaints are generated due to aircraft noise.

Therefore, there is increasing interest in aircrafts that can freely takeoff and landing without being greatly influenced by the place.

Various types of vertical takeoff and landing aircrafts are developed, and an example thereof is disclosed in Patent Application No. 10-2015-7006351.

An aircraft in the related art includes a wing 320; a tilt type tilting propulsion unit 420 for providing variable thrust between a thrust vector direction whose direction is at least generally perpendicular to the aircraft and a thrust vector direction which is the longitudinal axis as a whole; and a control unit 1290 configured to issue a control command to a controller 1410 of the tilt type propulsion unit to control the acceleration of the aircraft.

Such aircraft controls a thrust vector direction vertically during takeoff and landing, and adopts a tilting method in the longitudinal direction during flight.

However, since the related art as described above has a structure in which the thrust direction of the rear propeller is fixed downward, both the front and rear propellers can easily take off and land by concentrating thrust downward during takeoff and landing, but there is a problem that thrust is generated in the longitudinal direction only by the front propeller during flight and the rear propeller cannot generate the thrust by a structure in which the rear propeller is fixed to a flight fuselage.

In addition, the aircraft disclosed in US Patent Application Publication No. US2012/0091257 has a structure capable of tilting only the front propeller, and the rear propeller is fixed.

Therefore, when the aircraft takes off and lands, both the front and rear propellers are operated, but since the rear propeller is a simple load that does not generate forward thrust by being fixed to a flight fuselage during the flight after takeoff, such that the rear propeller contributes little to flight thrust generation.

SUMMARY OF INVENTION

Technical Problem

Accordingly, as the present invention is proposed to solve the above problems, the object of the present invention is to provide a vertical takeoff and landing aircraft which can concentrate thrust of a rear propeller and a front propeller rearward during flight as well as takeoff and landing by varying a thrust direction of the rear propeller as well as the front propeller, and can resolve imbalance in propulsion force caused by the different number of the front propeller and the rear propeller.

In addition, the present invention is to further propose a device that can cancel torque generated so as to maintain the advantages of the present invention while solving a problem of an aircraft having odd number of rotors, such as a tri-rotor system.

That is, it is possible to provide a method for canceling generated torque by providing a rear rotor and one more rotor in front, rear, or sideways, and by reversing the direction of rotation.

On the other hand, the technical problems to be achieved in the present invention are not limited to the technical problems mentioned above, and other technical problems not mentioned will be clearly understood by those skilled in the art from the following description.

Solution to Problem

To achieve the above object, according to one embodiment of the present invention, a vertical takeoff and landing aircraft includes a flight fuselage F on which a main wing 3 and auxiliary booms W1 and W2 are mounted; a pair of front propellers 7 respectively mounted at both sides of the flight fuselage F so as to be variable in horizontal and vertical directions; a rear propeller 9 mounted on the auxiliary booms W1 and W2 provided at the rear of the flight fuselage F so as to be variable in the horizontal and vertical directions; front and rear variable parts 11 and 13 mounted on the flight fuselage F and the auxiliary booms W1 and W2 so as to vary the front propellers 7 and the rear propeller 9 in the horizontal or vertical direction; and a control unit 50 for controlling the front and rear variable parts 11 and 13.

In addition, the vertical takeoff and landing aircraft may further include an interval adjusting unit 50 disposed between the pair of front propellers 7 so as to move each of the front variable part 11 to the flight fuselage in the horizontal direction, in which the interval adjusting unit 50 includes a sliding rail 52 that is disposed on the bottom of the flight fuselage F to slidably support a pair of front power sources 27, a driving unit 54 that is disposed between the pair of the front power sources 27 to move the front power source 27 in a horizontal direction by pushing or pulling, and an interval adjusting module M3 that controls a travel distance of the pair of the front power sources 27 by pressing the driving unit 54 according to a flight speed by associating with the control unit 60.

In addition, the variable part may include the front variable part 11 that varies the front propeller 7, and the rear variable part 13 that varies the rear propeller 9, the front variable part 11 may include a front variable power source 27 which can perform rotational movement and is mounted on both sides of the inside of the flight fuselage F, and a front variable frame 29 in which one end is connected to an output shaft of the front variable power source and the other end is connected to the front propeller 7 to vary the front propeller 7 in the horizontal direction or vertical direction by rotating at a predetermined angle, and the rear variable part 13 may include a rear variable power source 31 which can perform rotational movement and is mounted on one auxiliary boom W1 of the pair of the auxiliary booms W1 and W2, a first rear variable frame 33 in which one end is connected to an output shaft of the rear variable power source 31 and the other end is connected to the rear propeller 9 which varies the rear propeller 9 in the horizontal direction or vertical direction by rotating at a predetermined angle, and a second rear variable frame 35 in which one end is rotatably connected to the other auxiliary boom W2 of the pair of the auxiliary booms W1 and W2 and the other end is rotatably connected to the rear propeller 9.

In addition, the rear propeller 9 may include a rear guide 41 that is integrally connected between the first and second rear variable frames 33 and 35, and a rear propeller assembly 40 that generates thrust by being mounted on the inside of the rear guide 41, the rear propeller assembly 40 may include a rear driving source 43 that generates power for thrust, a rear propeller 42 that generates thrust by being mounted on an output shaft of the rear driving source 43, and a rear support frame 44 that connects and fixes the rear driving source 43 to an inner circumferential surface of the rear guide 41.

In addition, the control unit 50 may include a front variable control module 52 which may control the front variable power source, a rear variable control module 54 which may control the rear variable power source, and a computation unit 56 that detects the current rotation angle of the front and rear variable control modules 54 and adjusts a rotation angle by comparing with the target rotation angle by an output value received from a rotation angle sensor 58 mounted on the front and rear variable frames.

In addition, the sliding rail 52 may include a lower rail 59 fixedly disposed on the flight fuselage F, and a slider 60 that is coupled to the upper side of the lower rail 59, on which the front power source 27 is mounted on the upper side.

In addition, the rear propeller 9 may include the rear guide 41 that is integrally connected between the first and second rear variable frames 33 and 35, and the rear propeller assembly 40 that is mounted on the inside of the rear guide 41 to generate thrust, a plurality of the rear propellers 9 are provided, and the rear propeller assembly 40a of the first rear propeller among the plurality of the rear propellers 9 and the rear propeller assembly 40b of the second rear propeller among the plurality of the rear propellers 9 cancel torque generated while rotating in opposite directions.

In addition, the plurality of the rear propellers 40 may be arranged in a series, in parallel, or a mixture of at least a portion of series and parallel.

Advantageous Effects of Invention

First, since not only the front propeller but also the rear propeller may vary a thrust direction, it is possible to concentrate thrust of the front and rear propellers rearward during flight as well as takeoff and landing.

As described above, there are advantages that it is possible for the rear propeller to generate thrust without limiting to the role of a load by adopting a structure in which thrusts of the front and rear propellers can be variable, it is possible to increase energy efficiency according to the reduction of air resistance from the reduction of each size of the propellers by configuring each propeller as a smaller output propeller by distributing the thrusts in three parts in a case of an aircraft of the same type, and it is possible to improve flight stability by adopting a function to prevent sudden fall in the event of a failure of either the front or rear propeller.

Second, there is an advantage that it is possible to appropriately control the thrust of the front and rear propellers by detecting that the propulsion force of the front propeller is increased more than that of the rear propeller during takeoff, and the imbalance of the propulsion force between the front propeller and the rear propeller can be generated because the front propellers are two and the rear propeller is one.

Third, it is possible to efficiently fly by disposing the interval adjusting unit 50 and adjusting appropriately an interval between two front propellers according to the flight speed.

Fourth, in the present invention, a device capable of canceling generated torque can be additionally used in order to maintain the advantages of the present invention while solving the problem of the aircraft having odd number of rotors, such as a tri-rotor system.

That is, it is possible to provide a method of canceling the generated torque by providing a rotor of the rear propeller and one more rotor in front, rear, or sideways, and reversing the rotational direction.

On the other hand, the effect obtainable in the present invention is not limited to the effects mentioned above, other effects not mentioned will be clearly understood by those skilled in the art from the following description.

DESCRIPTION OF EMBODIMENTS

Figure 1:
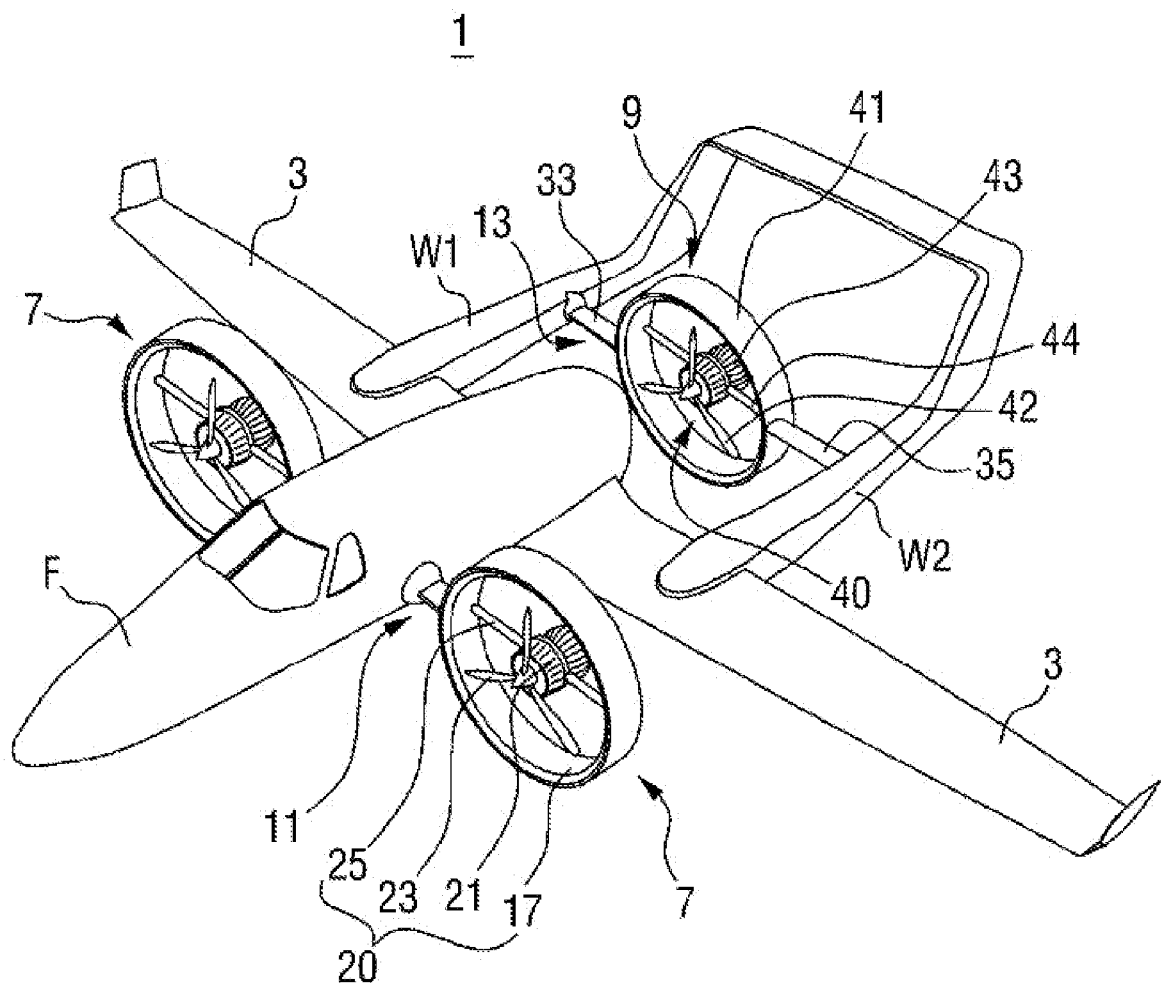
FIG. 1 is a perspective view illustrating a vertical takeoff and landing aircraft according to an embodiment of the present invention.
Figure 2:
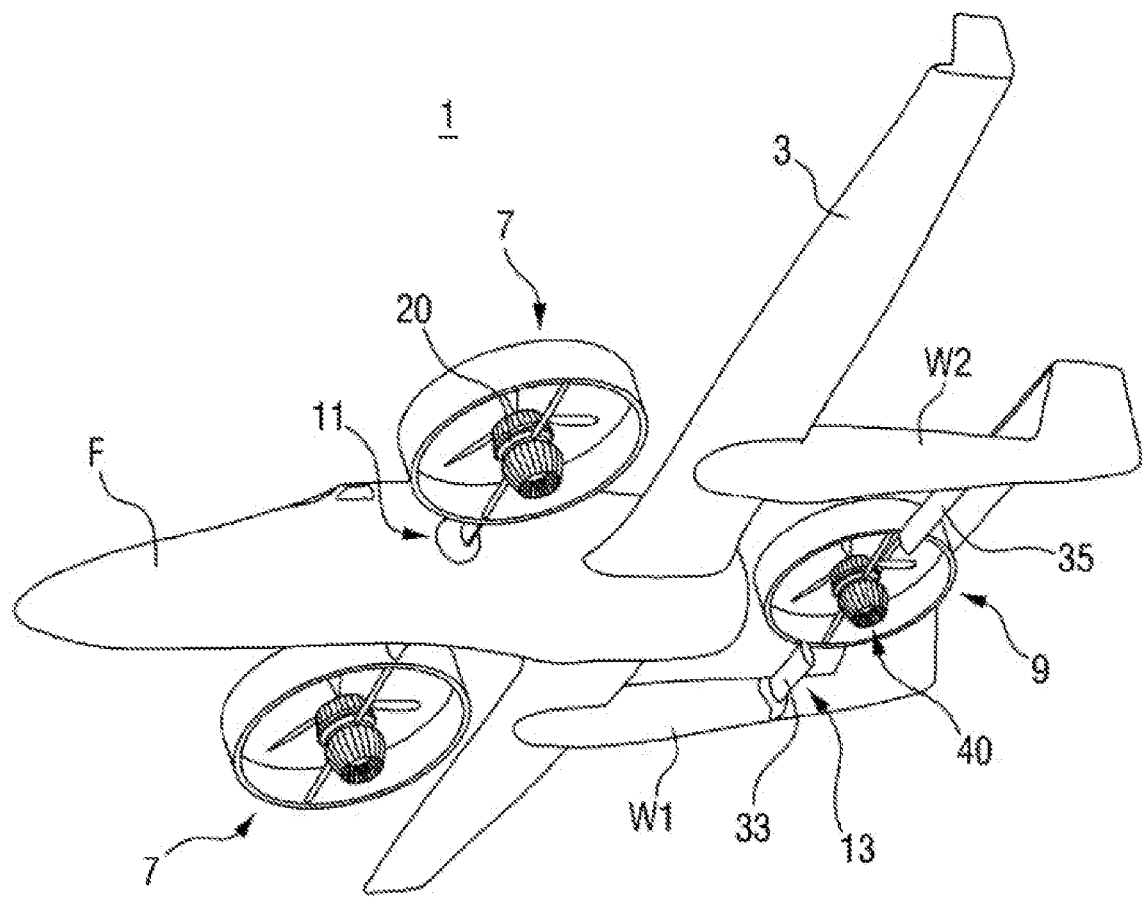
FIG. 2 is a bottom perspective view illustrating a state in which the vertical takeoff and landing aircraft illustrated in FIG. 1 is taking off and landing.
Figure 3:
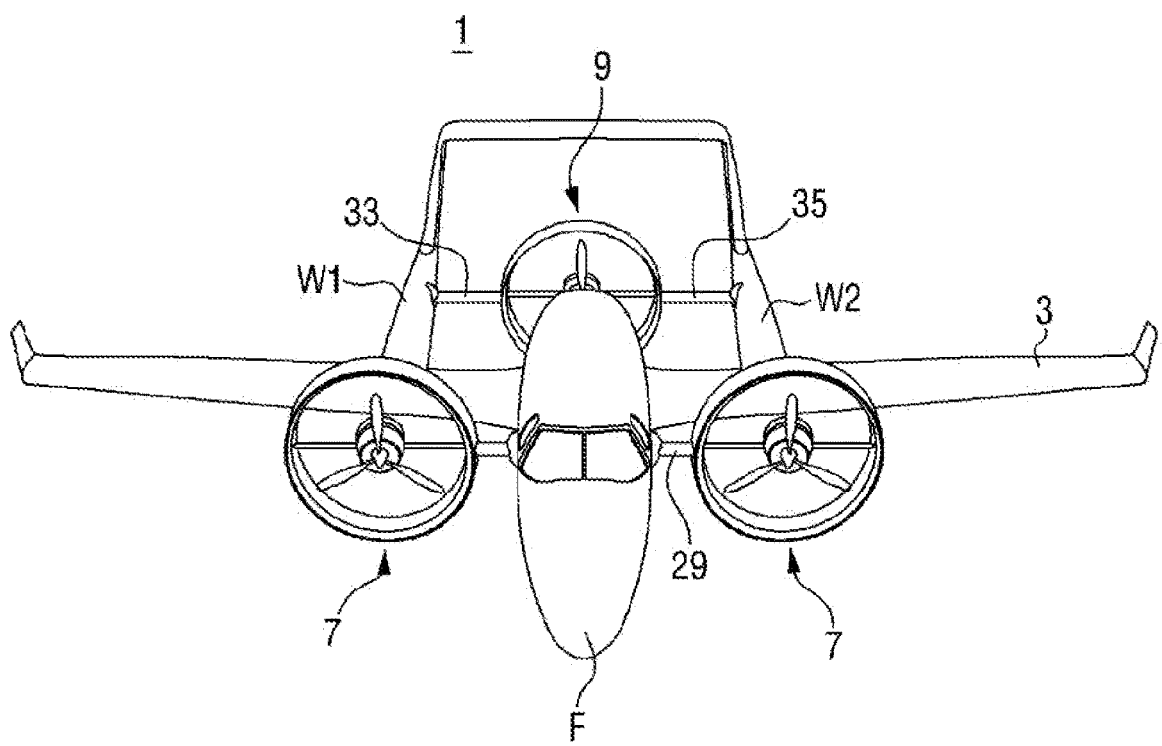
FIG. 3 is a diagram illustrating a state in which the vertical takeoff and landing aircraft illustrated in FIG. 1 flies.

Hereinafter, a vertical takeoff and landing aircraft according to an embodiment of the present invention will be described in detail with reference to the accompanying drawings.

As illustrated in FIG. 1 to FIG. 8, according to the present invention, a vertical takeoff and landing aircraft 1 includes a flight fuselage F on which a main wing 3 and auxiliary booms W1 and W2 are mounted; a pair of the front propellers 7 respectively mounted at both sides of the flight fuselage F so as to be variable in horizontal and vertical directions; a rear propeller 9 mounted on the auxiliary booms W1 and W2 provided at the rear of the flight fuselage F so as to be variable in horizontal and vertical directions; front and rear variable parts 11 and 13 mounted on the flight fuselage F and the auxiliary booms W1 and W2 so as to vary the front propellers 7 and the rear propeller 9 in the horizontal or vertical direction; a control unit 50 for controlling the front and rear variable parts 11 and 13; and a propulsion force correction unit 60 that enables stable takeoff by correcting the difference of propulsion force where there is a difference generated by detecting the propulsion force of the front and rear propellers 7 and 9.

In the vertical takeoff and landing aircraft 1 having such a structure, the pair of the front propellers 7 may be variable by being mounted on both sides of the flight fuselage F. That is, the vertical takeoff and landing aircraft 1 generates thrust downwards by varying the front propeller 7 in the direction of the ground during takeoff and landing, and generates the thrust backward by being varied forward during flight.

Since each of these front propellers 7 is mounted on the left and right sides, structures thereof are the same, and thus, one front propeller 7 will be described.

The front propeller 7 includes a front guide 17 that is integrally mounted on a front variable frame 29 which will be described below; and a front propeller assembly 20 that generates thrust by being mounted inside the front guide 17.

Therefore, a direction of the thrust in the front propeller 7 may be varied at the same time by the rotation of the front propeller assembly 20 and the front guide 17 according to the rotation of the front variable frame 29 in the horizontal direction or vertical direction.

More specifically, the front guide 17 serves to support the front propeller assembly 20, and is simultaneously connected to the flight fuselage F by the front variable frame 29.

The front guide 17 having a circular ring shape in which the upper and lower portions are open, is provided and has a closed structure in the circumferential direction. Therefore, when thrust is generated from the front propeller assembly 20 mounted therein, the thrust is output through an open place.

After all, the front guide 17 serves to support the front propeller assembly 20, and simultaneously serves to concentrate the thrust in one direction.

The front propeller assembly 20 for performing a role of the thrust includes a front drive source 21 that generates the power of the thrust; a front propeller 23 that generates the thrust by being mounted an output shaft of the front drive source 21; and a front support frame 25 that fixes the front drive source 21 by connecting to the inner circumferential surface of the front guide 17.

The front drive source 21 may be any type which can rotate the front propeller 23, and includes, for example, an engine, a motor, and the like.

By connecting the front propeller 23 to the front drive source 21, the thrust may be generated by rotating the front propeller 23 when an engine or a motor is driven.

As described above, the front propeller 7 is variably mounted on both sides of the aircraft body by a front variable part 11, and varies the front propeller 7 in the horizontal direction or vertical direction during takeoff and landing or flight.

That is, the variable part includes the front variable part 11 that varies the front propeller 7; and the rear variable part 13 that varies the rear propeller 9. The front variable part 11 may vary the front propeller 7 in the horizontal direction or the vertical direction if necessary, by connecting rotatably the front propeller 7 to the flight fuselage F.

Figure 4:
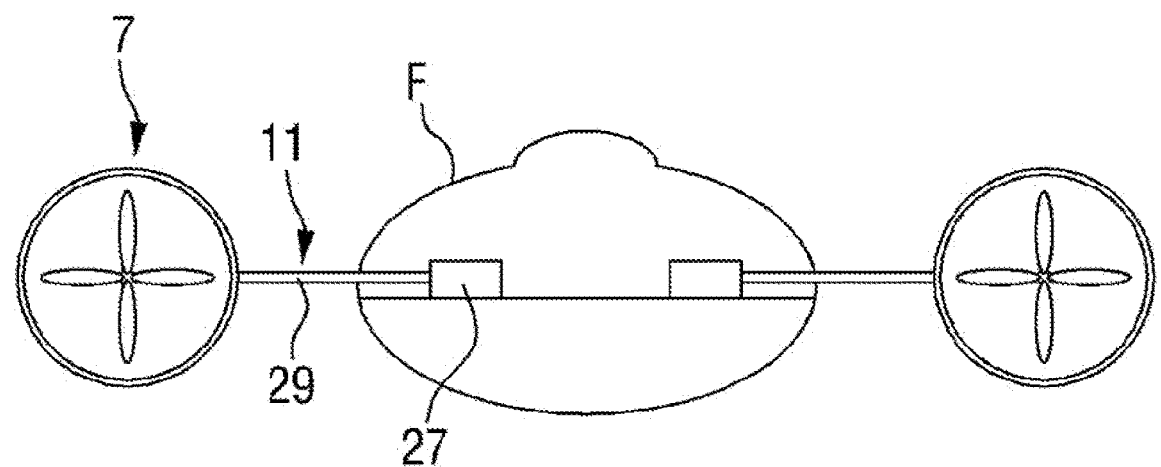
FIG. 4 is a front view illustrating a front variable part for varying a front propeller of the vertical takeoff and landing aircraft illustrated in FIG. 1.

More specifically, as illustrated in FIG. 4, the front variable part 11 includes a front power source 27 mounted on both sides of the inside of the flight fuselage F which may perform rotational movement; and the front variable frame 29 which may be varied in the horizontal direction or vertical direction by rotating the front propeller 7 at a predetermined angle by connecting one end to an output shaft of the front power source 27 and the other end to the front propeller 7.

The front power source 27 may include any type which can generate rotational force, for example, a motor, an engine, and the like. The front power source 27 is provided with an output shaft and has a structure capable of being rotated in the forward or reverse direction. For example, in a case of the engine, the rotational direction of the output shaft may be varied in forward and reverse directions through a transmission.

In addition, in a case of the motor, by varying the supply direction of the power supply, the output shaft may be variably rotated in the forward and reverse directions.

The output shaft is integrally connected to the front guide 17 of the front propeller 7 through the front variable frame 29.

Therefore, when a power source is driven, the front variable frame 29 is varied by the output shaft in the horizontal direction or vertical direction such that the front guide 17 and the front propeller assembly 20 may be also varied.

On the other hand, the rear propeller 9 is disposed at the rear of the flight fuselage F to generate thrust in the horizontal or vertical direction.

The rear propeller 9 is variably disposed by the rear variable part 13 between the auxiliary booms W1 and W2 arranged on a pair of main wings rearward.

The rear propeller 9 and the rear variable part 13 have the same structure as the front propeller 7 and the front variable part 11, but there is a difference in a structure connected to the auxiliary booms W1 and W2, and duplicate description is omitted.

The rear propeller 9 may be horizontally or vertically variable by being supported by the rear variable part 13 which will be described below.

Figure 5:
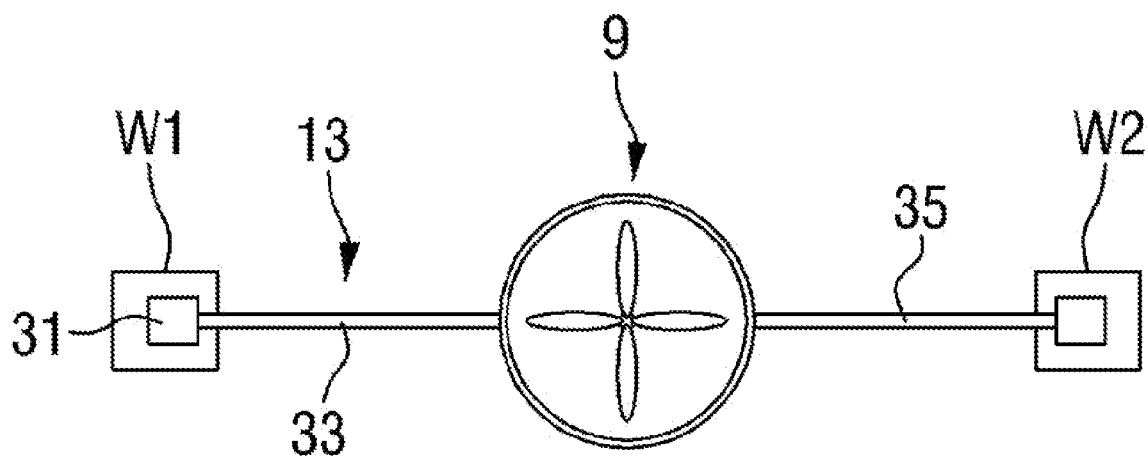
FIG. 5 is a front view illustrating a rear variable part for varying a rear propeller of the vertical takeoff and landing aircraft illustrated in FIG. 1.
Figure 6:
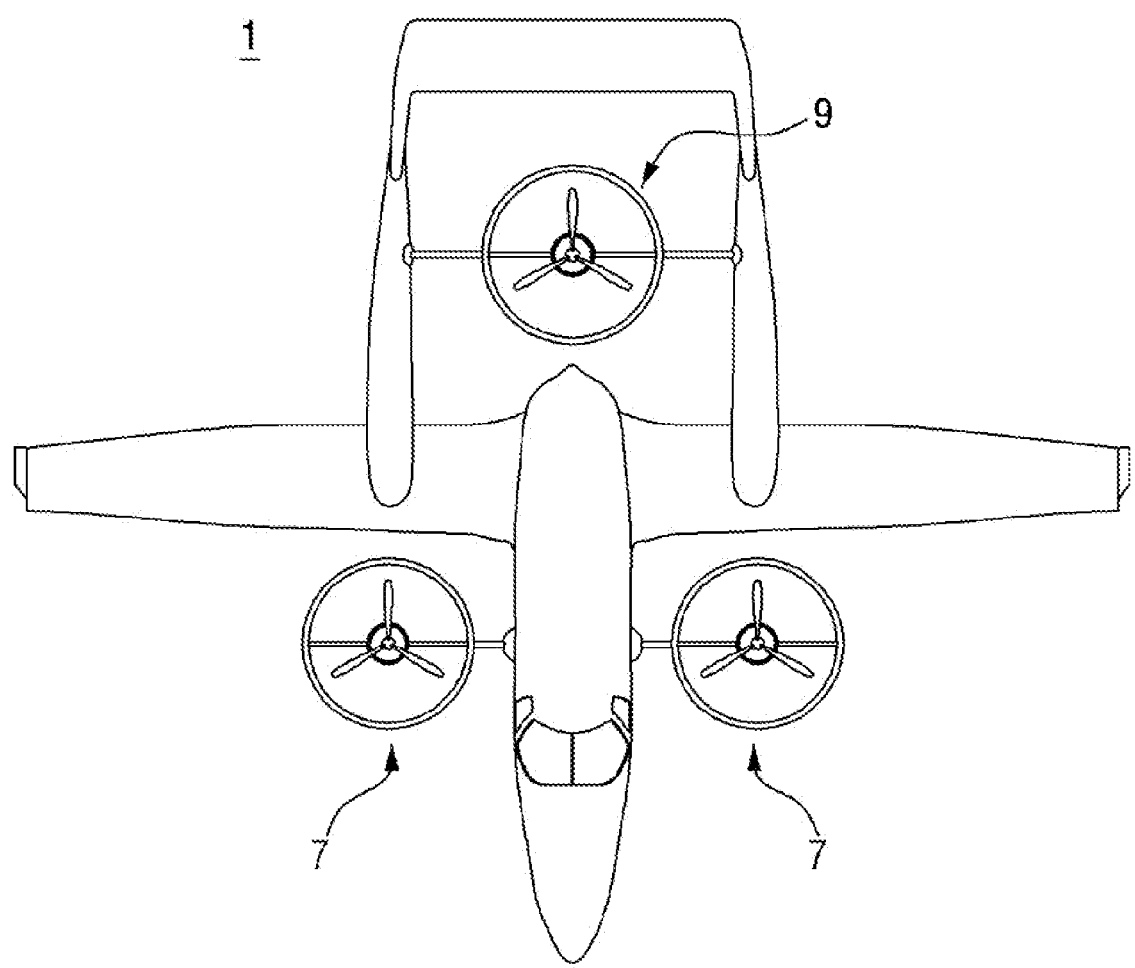
FIG. 6 is a plan view of the vertical takeoff and landing aircraft illustrated in FIG.
Figure 7:
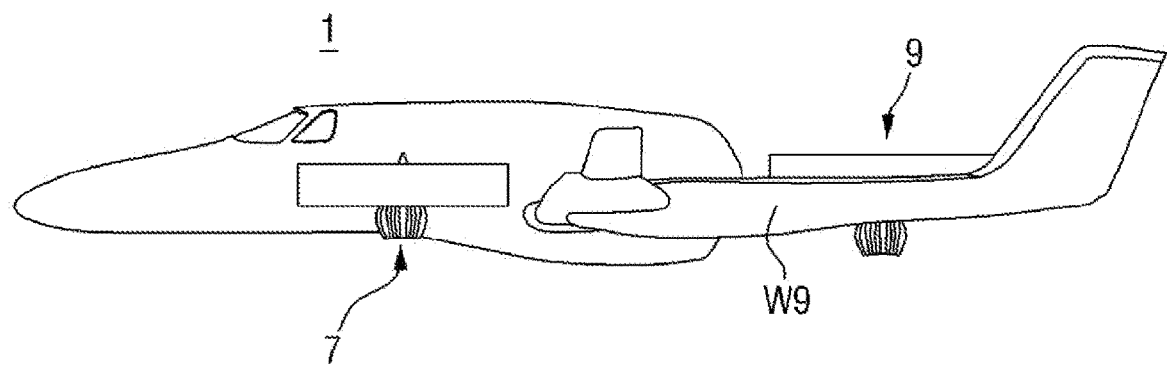
FIG. 7 is a side view of the vertical takeoff and landing aircraft illustrated in FIG.
Figure 8:
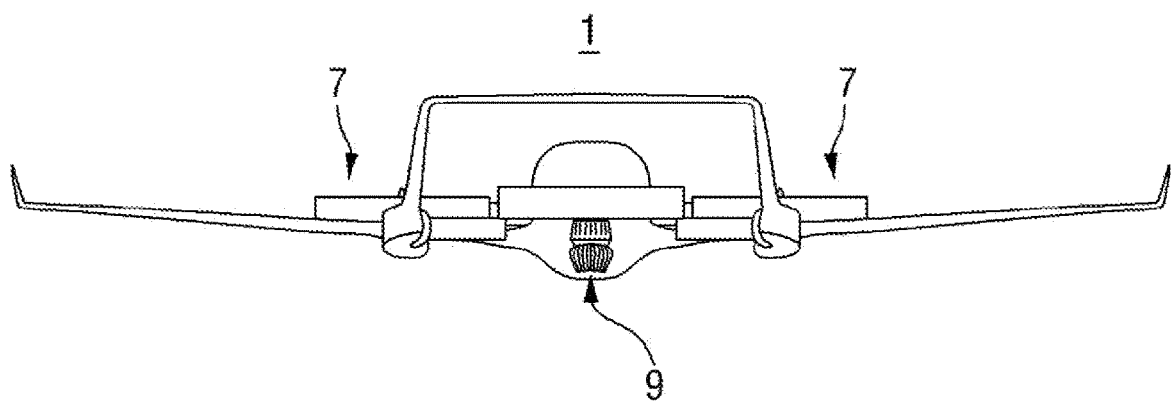
FIG. 8 is a rear view of the vertical takeoff and landing aircraft illustrated in FIG.

As illustrated in FIG. 5, the rear variable part 13 includes a first rear variable frame 33 which can vary the rear propeller 9 in the horizontal direction or vertical direction by being rotated at a predetermined angle by connecting one end to the output shaft of the rear variable power source 31 in one auxiliary boom W1 and fixedly the other end to the rear propeller 9; and the second rear variable frame 35 in which one end is rotatably connected to the other auxiliary boom W2 among the pair of the auxiliary booms W1 and W2 and the other end is rotatably connected to the rear propeller 9.

Therefore, when the rear variable power source 31 is driven, the rear propeller 9 may be varied in the horizontal or vertical direction by rotating the first rear variable frame 33 at a predetermined angle.

At this time, the variable power source includes an engine or a motor, and the rotation angle may be adjusted, so that the direction of the rear propellant 9 may be varied during takeoff and landing, or flight and direction change.

Both ends of the second rear variable frame 35 are respectively connected to the rear propeller 9 and the auxiliary booms W1 and W2 by a bearing or the like. Therefore, when the rear propeller 9 rotates, the second rear variable frame 35 may rotatably support the rear propeller 9.

In the above, it is described that the rear propeller 9 is rotated by the first rear variable frame, but the present invention is not limited thereto, and the rear propeller 9 may be rotated by the second rear variable frame 35.

The rear propeller 9 includes the rear guide 41 mounted between the first and second rear variable frames 33 and 35; and the rear propeller assembly 40 that generates thrust by being mounted inside the rear guide 41.

The rear guide 41 serves to support the rear propeller assembly 40, and is rotatably connected to the first and second rear variable frames 33 and 35 at the same time.

The rear guide 41 having a circular ring shape in which the upper and lower portions are open, is provided and has a closed structure in the circumferential direction. Therefore, when thrust is generated from the rear propeller assembly 40 mounted therein, the thrust is output through an open place.

After all, the rear guide 41 serves to support the rear propeller assembly 40, and simultaneously serves to concentrate the thrust in one direction.

The rear propeller assembly 40 serves to generate the thrust, and includes the rear driving source 43 that generates the power for the thrust; the rear propeller 42 that generates the thrust by being mounted on an output shaft of the rear driving source 43; and the rear support frame 44 that fixes the rear driving source 43 by connecting to the inner circumferential surface of the rear guide 41.

The rear driving source 43 may be any type which can rotate the rear propeller 42, and includes, for example, an engine, a motor, and the like.

By connecting the rear propeller 42 to the rear driving source 43, the thrust may be generated by rotating the rear propeller 42 when an engine or a motor is driven.

As described above, the rear propeller 9 is variably mounted by the rear variable part 13 between the pair of the auxiliary booms W1 and W2, and varies the rear propeller 9 in the horizontal direction or vertical direction during takeoff and landing or flight.

Figure 9:
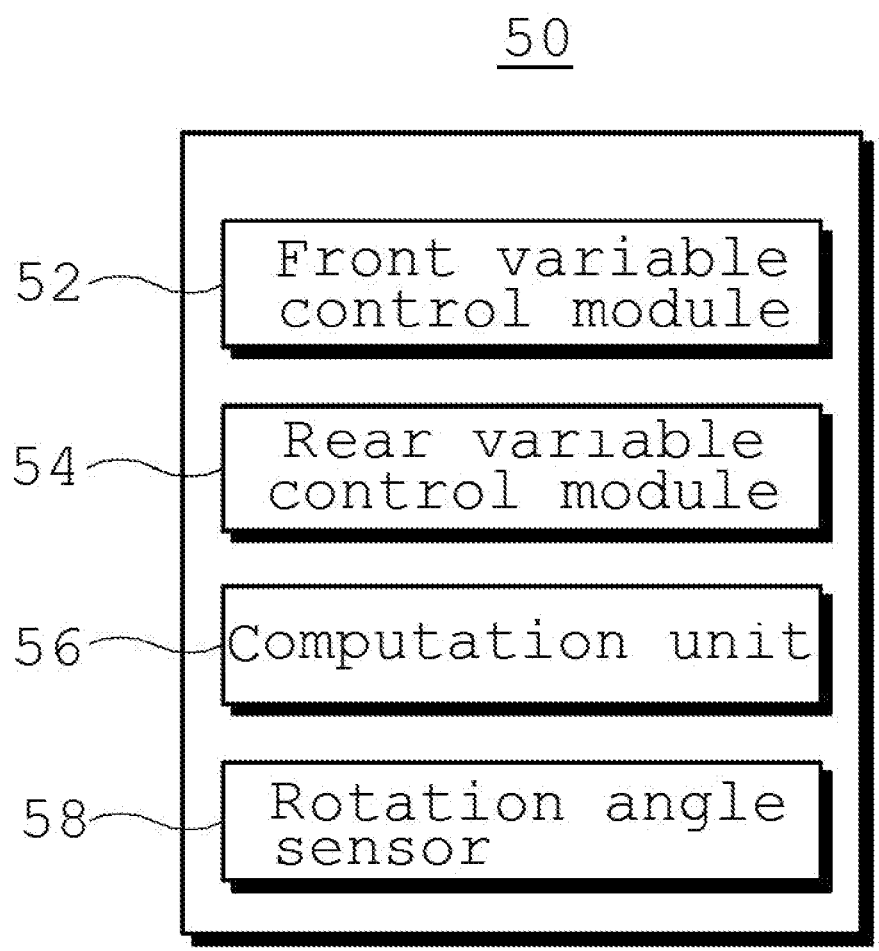
FIG. 9 is a block diagram illustrating a control unit for controlling a variable angle of forward and backward propellers of the vertical takeoff and landing aircraft illustrated in FIG. 1.

On the other hand, as illustrated in FIG. 9, the control unit 50 for controlling the front and rear variable parts may adjust a rotation angle of the front and rear propellers by controlling the front variable power source 27 of the front variable part 11 and the rear variable power source 31 of the rear variable part 13.

That is, the control unit 50 includes a front variable control module 52 that can control the front variable power source 27; a rear variable control module 54 that can control the rear variable power source 31; and a computation unit 56 that detects the present rotation angle of the front and rear variable control modules 54 by an output value received from a rotation angle sensor 58 mounted on the front and rear variable frames and adjusts a rotation angle in comparison with a target rotation angle.

Therefore, during takeoff and landing, the control unit 50 rotates the front and rear variable frames by transmitting a signal to the front and rear variable power sources and driving it, and then controls the thrust direction of the front and rear propellers toward the ground.

During flight, the control unit 50 rotates the front and rear variable frames by transmitting a signal to the front and rear variable power sources and driving it, and then controls the thrust direction of the front and rear propellers toward the rear.

At this time, if necessary, the control unit 50 may independently control the thrust direction of the front and rear propellers.

As described above, the front propellers 7 are mounted to be variable on both sides of the flight fuselage F, and the rear propeller 9 are mounted to be variable between the pair of the auxiliary booms W1 and W2 such that it is easy to perform takeoff and landing or flight.

On the other hand, the propulsion force correction unit 60 may solve instability during takeoff and landing of the aircraft due to the difference of the propulsion force generated between the front propeller 7 and the rear propeller 9.

Figure 10:
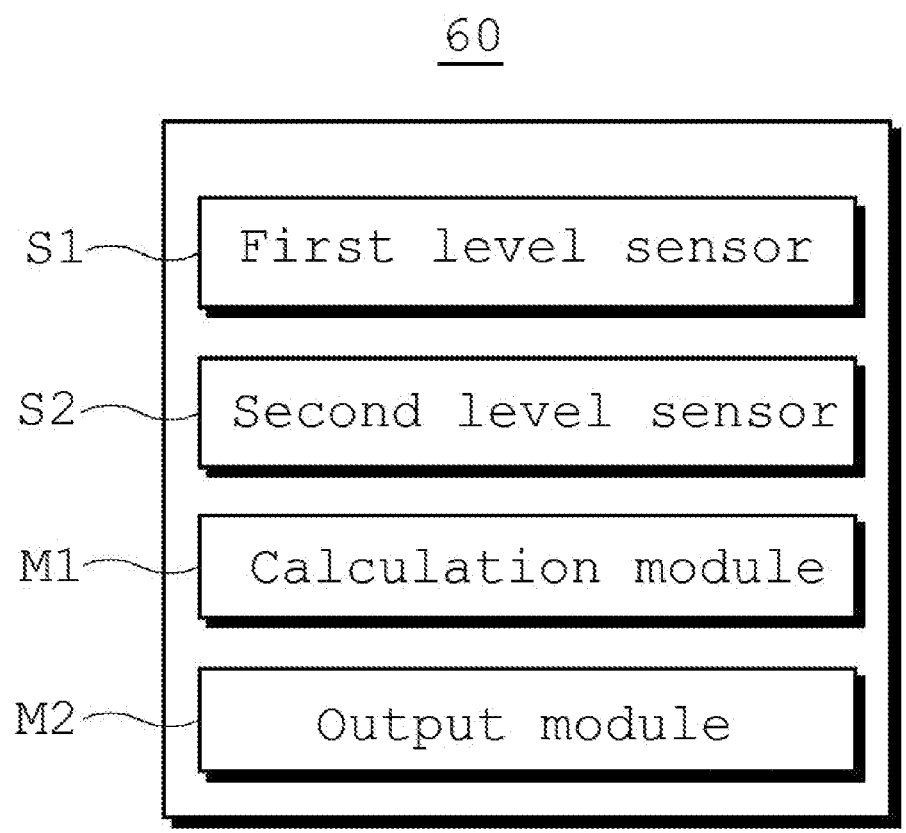
FIG. 10 is a block diagram schematically illustrating a structure of a propulsion force correction unit as another embodiment of the present invention.

That is, as illustrated in FIG. 1 and FIG. 10, since a triangle shape is disposed in which the front propellers 7 are two and the rear propeller 9 is one, the propulsion force of the front propeller is greater than the propulsion force of the rear propeller during takeoff and landing.

Therefore, the stern of the aircraft may be lifted upwards, which may eventually perform takeoff and landing in a state in which the aircraft is tilted.

In this problem, when the front and rear propellers are the same number, for example, when there are two front propellers and two rear propellers, the difference in propulsion force hardly occurs. However, in a structure in which two propellants are arranged as the front propeller, and the rear propeller is located between the two propellants while disposing one propellant as the rear propeller in order to reduce air resistance during horizontal flight as in the present invention, a difference in the propulsion thrust between the front propeller and the rear propeller occurs.

Therefore, a level sensor is mounted on each of the two front propellers, and the level sensor is also mounted on the rear propeller such that when the front propeller of the aircraft is tilted due to the difference of the propulsion force, the propulsion force may be corrected by detecting it.

More specifically, the propulsion force correction unit 60 includes a first level sensor S1 for detecting horizontal tilt by being mounted on two front propellers; a second level sensor S2 for detecting the horizontal tilt by being mounted on one rear propeller; a calculation module M1 that detects the direction of tilt by detecting the horizontal tilt and connecting to the first and second level sensors S1 and S2, and calculates a correction value of the propulsion force in the propellant mounted in the tilted direction; and an output module M2 that prevents tilting by increasing the rotational force by transmitting a signal to the propellant in the tilted direction due to the difference in tilt calculated by the calculation module M1.

Each of the first and second level sensors S1 and S2 is mounted to the propellant to sense the horizontal tilt, and various types of sensors may be applied. For example, it is possible to use a gyroscope type sensor.

The calculation module M1 detects the tilted direction by comparing slope values transmitted from each level sensor.

The calculation module M1 means a circuit element or the like where data is input and processed by an instruction such as a microprocessor.

Therefore, when detecting the tilted direction, the calculation module M detects the current rotational speed of the propellant mounted in the tilted direction.

The current rotational speed may be detected by sensing the rotational speed of a rotating shaft mounted on the propellant.

As described above, when the rotational speed of the propellant is detected in the tilted direction, the propulsion force corresponding to the rotational speed is calculated. At this time, since the propulsion force has a value smaller than that of the propulsion force of another propellant, the propulsion force used for balancing the propellant with another propellant is calculated.

The calculation module M1 calculates the number of the rotational speed corresponding to the calculated propulsion force, and enables the rotation with the number of rotational speed obtained by transmitting a signal to the corresponding propellant through the output module M2 to increase output.

On the other hand, in the vertical takeoff and landing aircraft of the present invention, since two front propellers 7 and one rear propeller 9 are arranged in a triangular shape, airflow generated from two front propellers 7 affects the rear propeller 9 during flight as well as takeoff and landing.

That is, since two air streams ejected rearward from two front propellers 7 are in a spread state, some of the propulsion force is weakened by colliding with the rear propeller 9.

In particular, when increasing the flight speed, more airflow impacts the rear propeller 9 further.

Therefore, according to the flight speed, it is possible to additionally mount an interval adjusting unit 50 which can appropriately adjust the interval of the front propellers 7.

Figure 11:
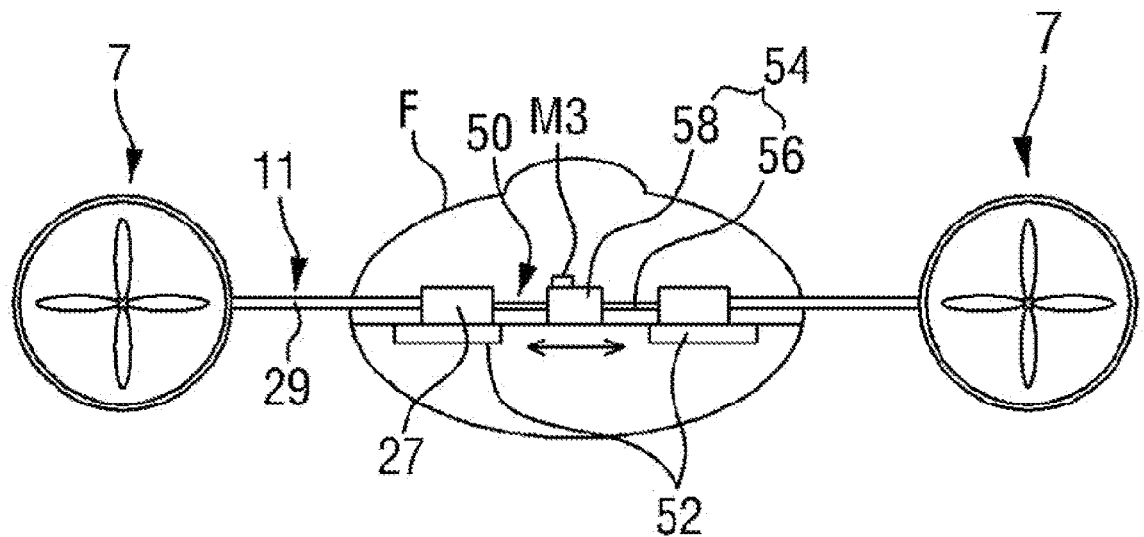
FIG. 11 is a diagram illustrating a state in which an interval between two front propellers is adjusted by an internal adjusting part as another embodiment of the present invention.
Figure 12:
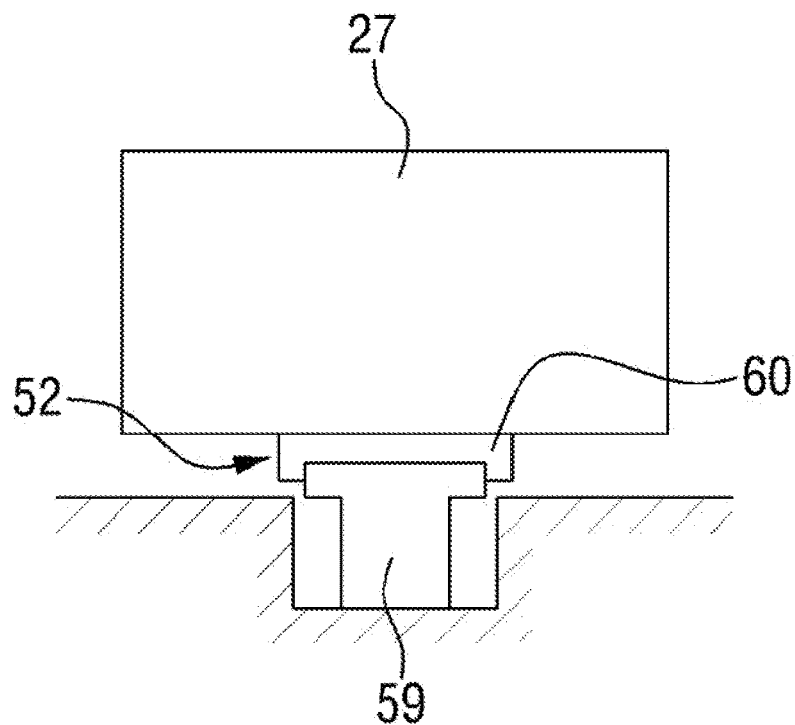
FIG. 12 is a diagram illustrating a state in which a front power source is seated on a sliding rail illustrated in FIG. 11.

More specifically, as illustrated in FIG. 11 and FIG. 12, the interval adjusting unit 50 has a structure in which the front variable part 11 mounted on each of two front propellers 7 is moved in the horizontal direction with respect to the flight fuselage.

That is, a sliding rail 52 disposed on the bottom of the fuselage to slidably support the pair of the front power sources 27; a driving unit 54 disposed between a pair of the front power sources 27 to push or pull the front power source 27 to move in the horizontal direction; and an interval adjusting module M3 that controls a travel distance of the pair of the front power sources 27 by pressing the driving unit 54 according to the flight speed by interlocking with the control unit, are included.

In the interval adjusting unit 50 having such a structure, the sliding rail 52 is configured with a lower rail 59 fixedly disposed on the fuselage; and a slider 60 that is coupled to the upper side of the lower rail 59 on which the front power source 27 is mounted on the upper side.

Therefore, since the front power source 27 is fixed to the upper portion of the slider 60, when an external force is applied thereto, the front power source 27 may move forward or backward along the horizontal direction.

The driving unit 54 is configured with a pair of pistons 56 that are respectively connected to the pair of the front power sources 27 and a pair of cylinders 58 that drive the pair of pistons 56.

At this time, the cylinder 58 includes a pneumatic or hydraulic cylinder.

Therefore, when the cylinder 58 is driven, as the piston 56 moves forward or backward, the pair of the front power sources 27 are pulled or pushed.

After all, two front propellers 7 connected to the pair of the front power sources 27 move forward or backward in the horizontal direction such that an interval therebetween can be appropriately adjusted.

At this time, the interval adjusting module M3 receives a flight speed signal transmitted from the control unit, and may appropriately adjust an interval between two front propellers 7 based on the signal.

Therefore, the driving unit 54 is driven by a signal generated from the interval adjusting module M3, and when the flight speed is high, the airflow generated from the front propellers 7 is formed long to affect the rear propeller such that this effect is minimized by widening the interval between two front propellers 7.

Conversely, when the flight speed is slow, the airflow generated from the front propellers 7 is formed relatively short, and thus has less influence on the rear propeller such that the interval between the two front propellers 7 is relatively narrow.

As described above, in the present invention, since the interval adjusting unit 50 is disposed on the vertical takeoff and landing aircraft and the interval between two front propellers 7 is appropriately adjusted according to the flight speed, efficient flight is possible.

Embodiment of Present Invention for Torque Cancellation

On the other hand, due to the characteristics of the tricopter in the present invention described above, since an aircraft having an odd number of rotors generates reaction force in a direction opposite to a propeller rotation direction, control on the aircraft may be difficult.

To do this, the tail wing of a helicopter is also used.

In addition, since a circular object that rotates at high speed generates torque at a right angle to a rotating shaft, which is called as the gyroscope effect and the aircraft may become unstable, additional control such as a tail wing is required.

Therefore, in the present invention, a device capable of canceling generated torque may be additionally used in order to maintain the advantages of the present invention while solving the problem of the aircraft having odd number of rotors, such as a tri-rotor system.

That is, it is possible to apply a method of canceling the generated torque by providing a rotor of the rear propeller and one more rotor in front, rear, or sideways, and reversing the rotational direction.

Figure 13A:
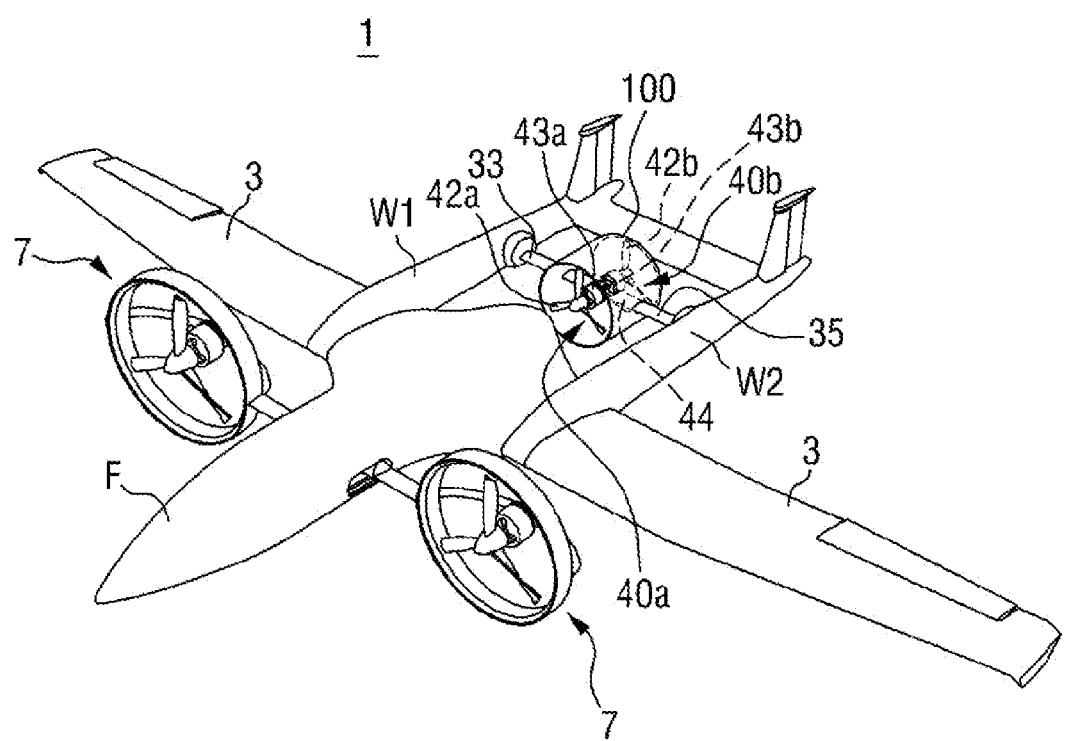
FIG. 13A and FIG. 13B illustrate the vertical takeoff and landing aircraft employing a structure to cancel torque generated by configuring a plurality of rear propellers according to an embodiment of the present invention.
Figure 13B:
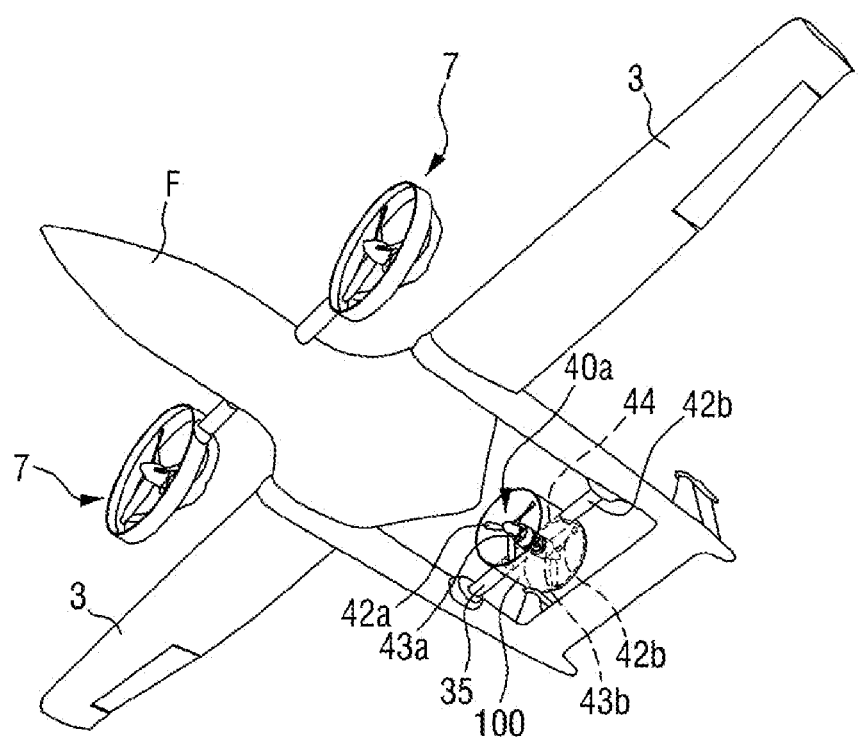
Figure 14:
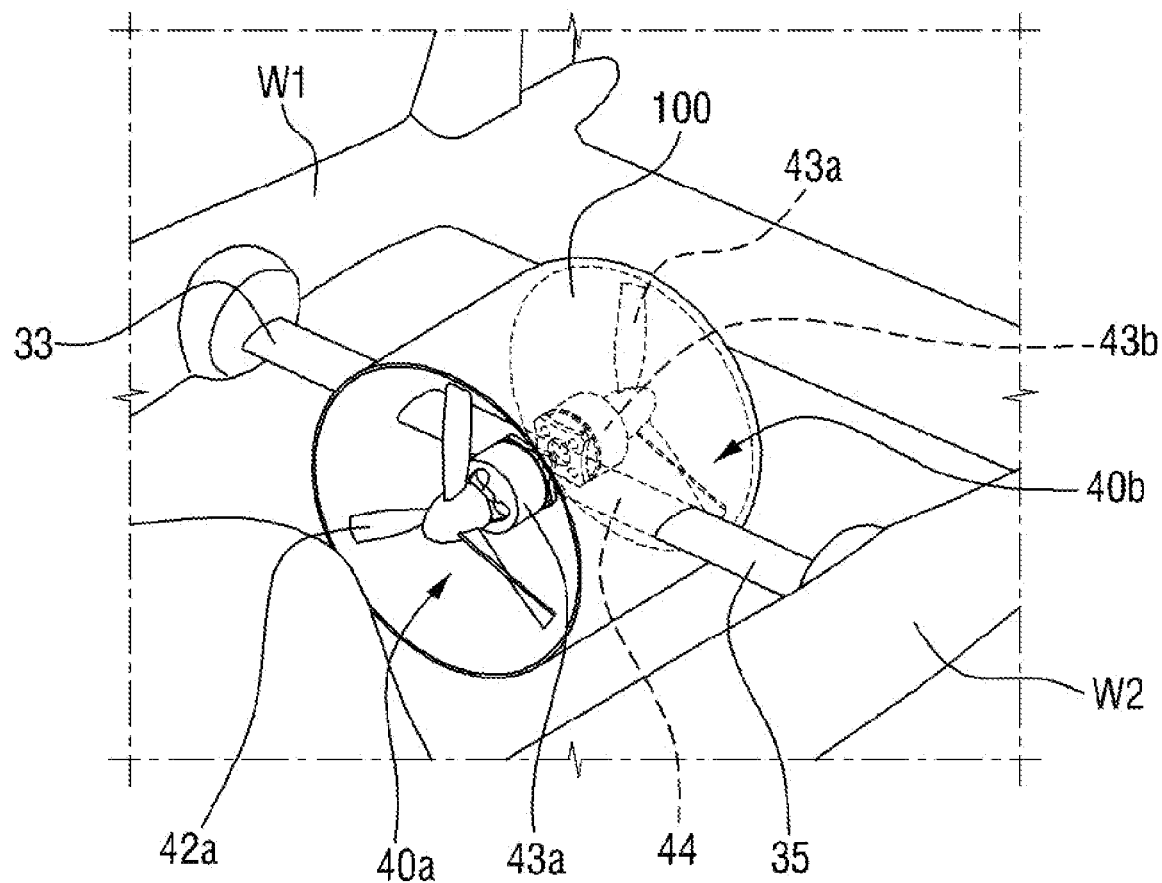
FIG. 14 illustrates an example of the rear propellers that cancel torque generated by multiple configuration applied to the vertical takeoff and landing aircraft in FIG. 13A and FIG. 13B.

FIG. 13A and FIG. 13B illustrate the vertical takeoff and landing aircraft employing a structure to cancel torque generated by configuring a plurality of the rear propellers according to an embodiment of the present invention, and FIG. 14 illustrates an example of the plurality of the rear propellers applied to the vertical takeoff and landing aircraft of FIG. 13A and FIG. 13B to cancel the generated torque.

With reference to FIG. 13A, FIG. 13B, and FIG. 14, since the configuration of the front propeller 7, the front and rear variable parts 11 and 13, and the like is the same as the above-described configuration, redundant description is omitted for simplicity of the specification, and the structure of the differentiated rear propeller 9 will be described.

With reference to FIG. 13A, FIG. 13B, and FIG. 14, the rear propeller 9 according to the present embodiment is provided on the rear support frame 44 between the first rear variable frame 33 and the second rear variable frame 35.

In particular, the rear propeller 9 is configured with the plurality of the rear propeller assemblies 40.

In the drawings and embodiments, it is described on the assumption that the rear propeller assemblies 40 are two, but may be implemented with a larger number of rear propeller assemblies 40.

Therefore, the plurality of the rear propeller assemblies 40 include the plurality of the rear propellers 42 and a plurality of the rear driving sources 43.

With reference to FIG. 13A, FIG. 13B, and FIG. 14, a first rear driving source 43a includes a first rear driving source 43a.

In addition, a second rear propeller 42b includes a second rear driving source 43b.

At this time, through manipulation of the first rear driving source 43a and the second rear driving source 43b, the first rear driving source 43a and the second rear propeller 42b rotate in different direction to cancel the generated torque.

When the direction of the rotating axis of a rotating object varies, a mysterious physical phenomenon that cannot be intuitively easily understood occurs. A representative example of this is a gyroscope.

That is, if one end of the gyroscope's center axis is placed on a fixed point and then left still while the center axis is held horizontally, the opposite side of the center axis falls down by gravity when the inertial wheel does not rotate.

However, a completely different phenomenon occurs when the inertial wheel is rotating. In a state where the central axis is horizontal, the circular motion is continued around the fixed point. This movement of the central axis of rotation is called as precession.

Therefore, in the present invention, based on the principle of the gyroscope, the torque generated by rotating in different directions can be canceled in a state where a plurality of propellers are provided in parallel.

On the other hand, in the present embodiment, it is described on the assumption that the plurality of the rear propeller assemblies 40 are connected in parallel, but the content of the present invention is not limited thereto, and it is also possible to connect a plurality of them in series or mix them in series and parallel.

Effect According to Present Invention

Normal airplanes require a large runway during takeoff and landing, and helicopter type airplanes or tricopters, quadcopters, hexacopters, and the like of the helicopter type represented by drones, fly with only propeller's thrust, and thus, there is a significant difference from airplanes in terms of power efficiency and speed when driving.

In addition, while no runway is required, power efficiency and maneuverability are significantly reduced.

The vertical takeoff and landing aircraft proposed in this specification is invented by taking advantage of airplanes and helicopters because the variable propellers are configured with two front propellers and one rear propeller.

The vertical takeoff and landing aircraft hereinafter, VTOL in the related art includes the Hercules aircraft operated by the U.S. military represented by twin-engine vertical takeoff and landing aircraft, an aircraft developed by the Korea Space Agency, and the like. In the tri-rotor type, the main method is that the front variable propeller and the rear propeller are fixed and are not working while driving.

The quad-rotor type is developed in various ways in recent years.

Hereinafter, the effects by the aircraft in different ways from the vertical takeoff and landing aircraft according to the present invention, are mutually analyzed.

(1) Comparison of Twin Rotor Type VTOL Aircraft and Present Invention

The twin-rotor VTOL aircraft are known for unstable takeoff and landing behavior. As a typical example, there is the Hercules of the U.S. military which is stigmatized as a widow maker due to frequent accidents.

In addition, there is a problem in that high-speed driving is not easy because the propeller is large enough to be compared to a helicopter.

On the other hand, since the proposed invention is equipped with a tilt rotor at the rear, a more stable operation is easy during takeoff and landing.

That is, the present invention can be compared with a bicycle and a tricycle.

In addition, by adding one more rotor to the rear, by reducing the size of the front propeller while maintaining the same overall power, it is possible to reduce air resistance during flight, and it is possible to facilitate relatively high-speed flight at the same time.

In addition, when the control system of the front and rear rotors is duplicated, even if either control system malfunctions, it is possible to improve the stability as sliding and landing are possible like an airplane of the related art.

(2) Comparison of Tri-Rotor VTOL Aircraft and Present Invention

The present invention is advantageous in terms of power efficiency because the rear rotor in the tri-rotor method of the related art is a fixed type and can be served only as a load during flight except for takeoff and landing.

In addition, as with the twin-rotor method, the rear rotor fixed type VTOL is difficult to guarantee, not only for takeoff and landing, but also for flight if either of the two front rotors fails.

(3) Comparison of Quad-Rotor Type VTOL Aircraft and Present Invention

There is no difference in terms of driving performance or power efficiency of the quad-rotor method.

However, when the control system of the front and rear rotors, which is the most essential content of this patent, is duplicated, and the control system of one side malfunctions, even if the control system is duplicated in the same way in a case of a quadcopter, it is not easy compared to the tri-rotor method of this patent due to the variation in the center of gravity of the flight when the front system fails.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in a memory unit and driven by a processor. The memory unit is located inside or outside the processor and may exchange data with the processor by various known means.

The detailed description of preferred embodiments of the present invention disclosed as described above has been provided to enable those skilled in the art to implement and practice the present invention. Although described above with reference to preferred embodiments of the present invention, those skilled in the art will appreciate that various modifications and changes can be made to the present invention without departing from the scope of the present invention. For example, those skilled in the art can use each of the configurations described in the above-described embodiments in a manner of combining with each other. Accordingly, the present invention is not intended to be limited to the embodiments presented herein, but to give the broadest scope consistent with the principles and novel features disclosed herein.

The present invention may be embodied in other specific forms without departing from the spirit and essential features of the present invention. Accordingly, the above detailed description should not be construed as limiting in all respects and should be considered illustrative. The scope of the invention should be determined by rational interpretation of the appended claims, and all changes within the equivalent scope of the invention are included in the scope of the invention. The present invention is not intended to be limited to the embodiments presented herein but is intended to give the broadest scope consistent with the principles and novel features disclosed herein. In addition, claims that do not have an explicit citation relationship in the claims can be combined to form an embodiment or included as a new claim by amendment after filing.

The invention claimed is:

1. A vertical takeoff and landing aircraft comprising:
a flight fuselage on which a main wing is mounted;
first and second auxiliary booms mounted on respective left and right sides of the main wing;
a pair of front propellers respectively mounted at left and right sides of the flight fuselage on front variable parts and configured to be variable in horizontal and vertical directions;
a rear propeller mounted between the auxiliary booms on rear variable parts at a rear of the flight fuselage and configured to be variable in the horizontal and vertical directions;
a control unit for controlling the front and rear variable parts and;
an interval adjusting unit disposed between the pair of front propellers and configured to move each of the front variable parts in the horizontal direction,
wherein the interval adjusting unit includes a sliding rail that is disposed on the bottom of the flight fuselage to slidably support a pair of front variable power sources, a driving unit that is disposed between the pair of the front variable power sources to move the front variable power sources in the horizontal direction by pushing or pulling, and an interval adjusting module that is configured to control a travel distance of the pair of the front variable power sources by sending a signal to the driving unit based on a flight speed signal transmitted by the control unit; and
wherein the front variable power sources are configured to drive the pair of front propellers.

2. The vertical takeoff and landing aircraft according to claim 1, wherein
the pair of front variable power sources can perform rotational movement and are mounted on both sides of the inside of the flight fuselage, and a front variable frame in which one end is connected to an output shaft of one of the pair of the front variable power sources and the other end is connected to one of pair of the front propellers to vary the propeller in the horizontal direction or vertical direction by rotating at a predetermined angle, and
the rear variable parts include a rear variable power source which can perform rotational movement and is mounted on one auxiliary boom of the pair of the auxiliary booms, a first rear variable frame in which one end is connected to an output shaft of the rear variable power source and the other end is connected to the rear propeller which varies the rear propeller in the horizontal direction or vertical direction by rotating at a predetermined angle, and a second rear variable frame in which one end is rotatably connected to the other auxiliary boom of the pair of the auxiliary booms and the other end is rotatably connected to the rear propeller.

3. The vertical takeoff and landing aircraft according to claim 2,
wherein the rear propeller includes a rear guide that is integrally connected between the first and second rear variable frames, and a rear propeller assembly that generates thrust by being mounted on the inside of the rear guide, the rear propeller assembly includes a rear driving source that generates power for thrust, propeller blades that generate thrust by being mounted on an output shaft of the rear driving source, and a rear support frame that connects and fixes the rear driving source to an inner circumferential surface of the rear guide.

4. The vertical takeoff and landing aircraft according to claim 2,
wherein the control unit includes a front variable control module which can control the front variable power sources, a rear variable control module which can control the rear variable power source, and a computation unit that detects a rotation angle of the front and rear variable control modules and adjusts a rotation angle by comparing with the target rotation angle by an output value received from a rotation angle sensor mounted on the front and rear variable frames.

5. The vertical takeoff and landing aircraft according to claim 1,
wherein the sliding rail includes a lower rail fixedly disposed on the flight fuselage, and a slider that is coupled to an upper side of the lower rail, on which a power source of the pair of front variable power sources is mounted on the upper side.

6. The vertical takeoff and landing aircraft according to claim 3,
wherein the rear propeller includes the rear guide that is integrally connected between the first and second rear variable frames, and the rear propeller assembly that is mounted on the inside of the rear guide to generate thrust, a plurality of the rear propellers are provided, and the rear propeller assembly of a first rear propeller among the plurality of the rear propellers and the rear propeller assembly of a second rear propeller among the plurality of the rear propellers cancel torque generated while rotating in opposite directions.

7. The vertical takeoff and landing aircraft according to claim 6,
wherein the plurality of the rear propellers are arranged in a series, in parallel, or a mixture of at least a portion of series and parallel.

* * * * *